US012619983B2

(12) United States Patent
Robinson et al.

(10) Patent No.: US 12,619,983 B2
(45) Date of Patent: May 5, 2026

(54) MACHINE LEARNING CLASSIFIER BASED ON CATEGORY MODELING

(71) Applicant: Steady Platform LLC, Atlanta, GA (US)

(72) Inventors: Jason Robinson, Atlanta, GA (US); Andrew Toloff, Atlanta, GA (US); Tyler Howard, Atlanta, GA (US); Nathan Crockett, Atlanta, GA (US); Amanda Miguel, Atlanta, GA (US); Marcel Crudele, Atlanta, GA (US)

(73) Assignee: STEADY PLATFORM LLC, Atlanta, GA (US)

( * ) Notice: Subject to any disclaimer, the term of this patent is extended or adjusted under 35 U.S.C. 154(b) by 833 days.

(21) Appl. No.: 17/867,958

(22) Filed: Jul. 19, 2022

(65) Prior Publication Data

US 2022/0398573 A1     Dec. 15, 2022

Related U.S. Application Data

(63) Continuation-in-part of application No. 17/342,622, filed on Jun. 9, 2021, now Pat. No. 11,798,100.

(51) Int. Cl.
*G06N 20/00*     (2019.01)
*G06F 16/3332*     (2025.01)
(Continued)

(52) U.S. Cl.
CPC ....... *G06Q 20/389* (2013.01); *G06F 16/3335* (2019.01); *G06F 16/35* (2019.01); *G06N 20/00* (2019.01)

(58) Field of Classification Search
CPC ... G06Q 20/389; G06F 16/3335; G06F 16/35; G06N 20/00
See application file for complete search history.

(56) References Cited

U.S. PATENT DOCUMENTS 10,460,391 B2   10/2019   Caldwell
10,475,125 B1 *   11/2019   Kumari .................. G06N 20/00
(Continued)

OTHER PUBLICATIONS

AbdulSattar, Khadija, and Mustafa Hammad. "Fraudulent transaction detection in FinTech using machine learning algorithms." 2020 International Conference on Innovation and Intelligence for Informatics, Computing and Technologies (3ICT). IEEE, 2020 (Year: 2020).*

(Continued)

*Primary Examiner* — Andrew T McIntosh
(74) *Attorney, Agent, or Firm* — Buckley, Maschoff & Talwalkar LLC

(57) ABSTRACT

Provided are systems and methods which can use machine learning to draw additional inferences about transaction records from transaction strings. The inferred data can be used to build a classification model configured to map transaction string to predefined categories. In one example, a method may include receiving a file comprising transaction strings corresponding to a plurality of transaction records, executing the machine learning model on the transaction strings to identify a plurality of categories associated with the transaction strings, generating a classifier model that comprises patterns of keywords from the transactions strings mapped to the plurality of identified categories, respectively, and storing the classifier model in the data store.

14 Claims, 10 Drawing Sheets

340

(51) Int. Cl.
  *G06F 16/35* (2019.01)
  *G06Q 20/38* (2012.01)

(56) References Cited

U.S. PATENT DOCUMENTS

| | | | |
|---|---|---|---|
| 10,510,113 B2 | 12/2019 | Caldwell | |
| 10,984,468 B1 | 4/2021 | Hockey et al. | |
| 2018/0218448 A1 | 8/2018 | Thomas et al. | |
| 2018/0350007 A1* | 12/2018 | Chen | G06N 20/00 |
| 2019/0066203 A1 | 2/2019 | Smith et al. | |
| 2020/0118137 A1* | 4/2020 | Sood | G06Q 10/00 |
| 2020/0126118 A1* | 4/2020 | Yang | G06F 17/18 |
| 2020/0137080 A1 | 4/2020 | Bloomquist et al. | |
| 2021/0117990 A1* | 4/2021 | Jumper | G06Q 30/0201 |
| 2021/0233162 A1 | 7/2021 | Hockey et al. | |
| 2021/0241256 A1* | 8/2021 | Caldwell | G06Q 20/3224 |
| 2021/0326980 A1 | 10/2021 | Thomas et al. | |
| 2022/0075801 A1* | 3/2022 | Chai | G06F 16/285 |
| 2022/0121984 A1* | 4/2022 | Gupta | G06N 20/20 |
| 2022/0172211 A1* | 6/2022 | Muthuswamy | G06F 16/288 |
| 2022/0318898 A1* | 10/2022 | Pei | G06F 17/16 |
| 2022/0358508 A1* | 11/2022 | Pandillapalli | G06Q 20/36 |
| 2023/0118240 A1* | 4/2023 | Wong | G06Q 20/4015 |
| | | | 705/44 |

OTHER PUBLICATIONS

Domashova, Jenny, and Elena Kripak. "Identification of non-typical international transactions on bank cards of individuals using machine learning methods." Procedia Computer Science 190 (2021): 178-183 (Year: 2021).*

Byrd, David, and Antigoni Polychroniadou. "Differentially private secure multi-party computation for federated learning in financial applications." Proceedings of the first ACM international conference on AI in finance. 2020 (Year: 2020).*

Bost, Raphael, et al. "Machine learning classification over encrypted data." Cryptology ePrint Archive (2014) (Year: 2014).*

* cited by examiner

Figure 3B:
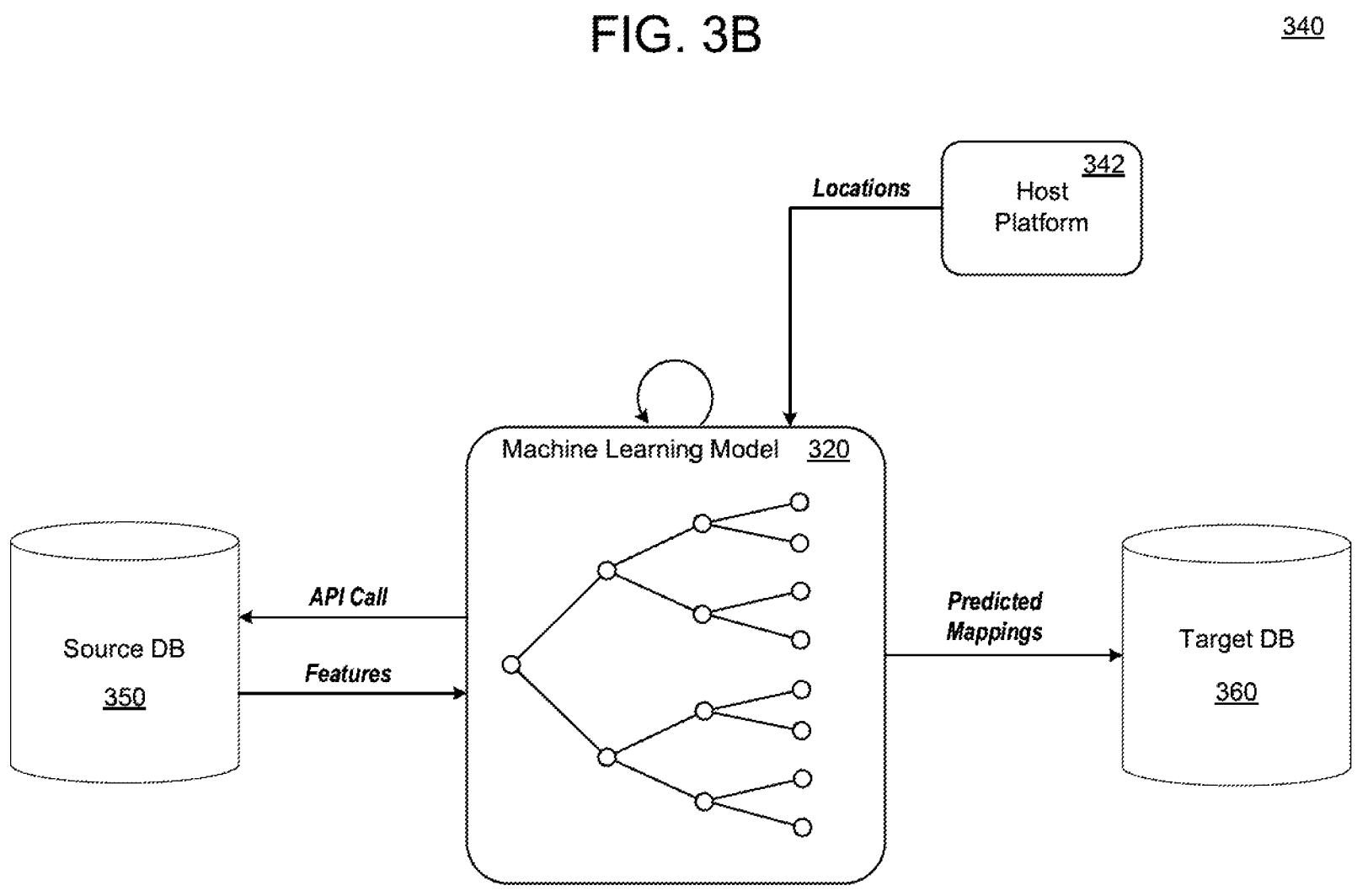

Host Platform 342

Locations

Machine Learning Model 320

Predicted Mappings

Target DB 360

API Call

Features

Source DB 350

FIG. 5          500

Receiving a File with Transaction Strings — 510

Executing a Machine Learning Model on the Transaction Strings to Identify Mappings to a Plurality of Categories — 520

Generating a Classifier Model based on The Identified Mappings — 530

Storing the Classifier Model — 540

MACHINE LEARNING CLASSIFIER BASED ON CATEGORY MODELING

CROSS-REFERENCE TO RELATED APPLICATION(S)

The present application is a continuation-in-part (CIP) of U.S. patent application Ser. No. 17/342,622, filed on Jun. 9, 2021, in the United States Patent and Trademark Office, which is fully incorporated herein by reference for all purposes.

BACKGROUND

When a financial account is used in a financial transaction, for example, a payment to another, receipt of funds, transfer of funds, etc., a record is typically created by the financial institution that issued the financial account. The transaction record may include a transaction string embodied as a collection of text that provides details about a financial transaction. In particular, that transaction string may include some helpful features about the transaction such as a date of the transaction, a location of the transaction, a type or purpose of the transaction, and in some cases, an identifier of a counterparty entity (e.g., the entity that owns the other account) involved in the transaction.

Transaction strings in raw format often contain a significant amount of variability. For example, two payment transactions from an employer to an employee may cause the financial institution to create two different transaction strings with significantly different content such as different sub strings, different account identifiers, different dates, different locations, and the like. The variability within the transaction strings makes it difficult to categorize transactions together for further processing.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1A:
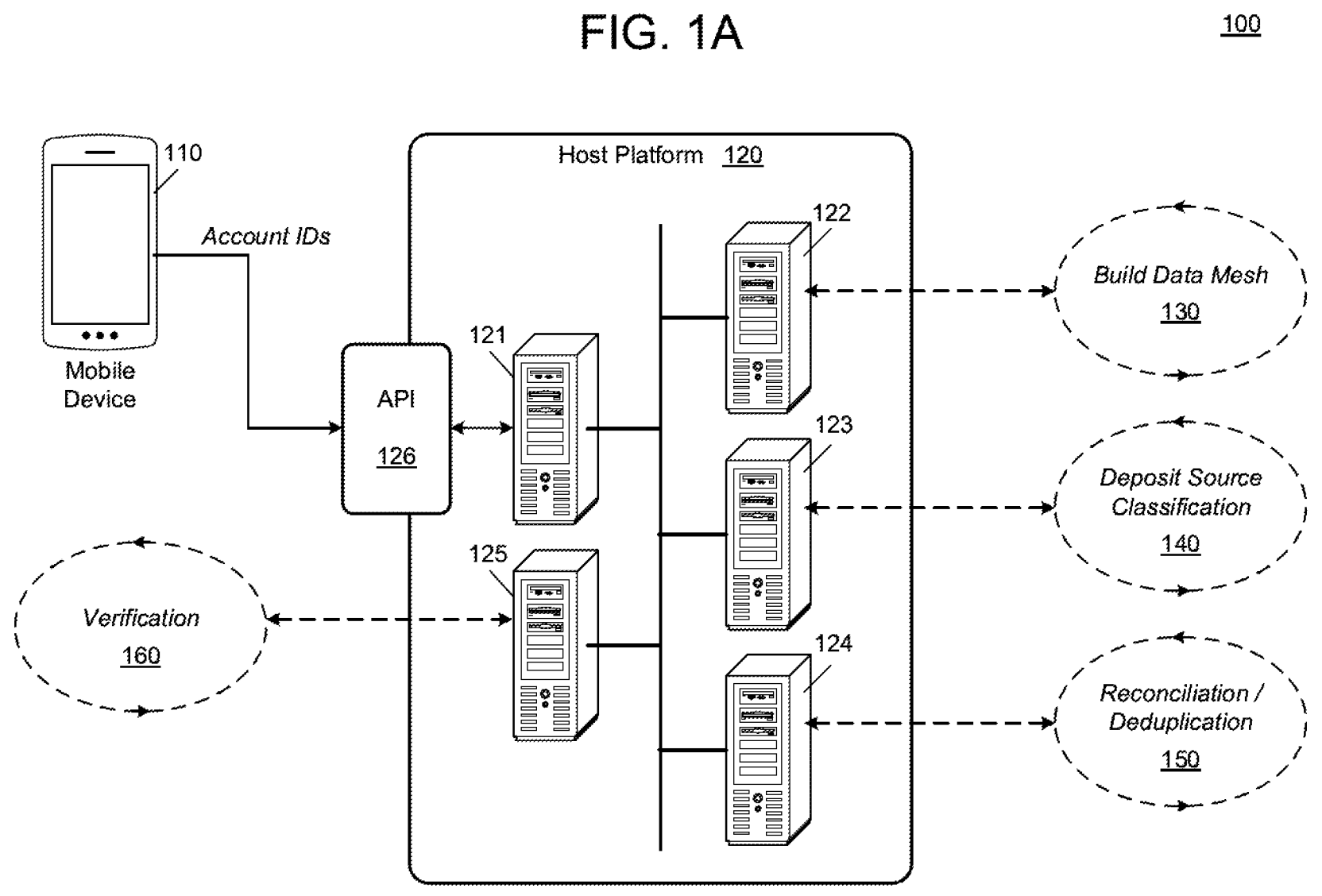

FIG. 1A-1B are diagrams illustrating a host platform that is configured for categorizing transactions in accordance with example embodiments.

FIGS. 3A-3C are diagrams illustrating a process of building a classifier via machine learning in accordance with example embodiments.

Figure 1B:
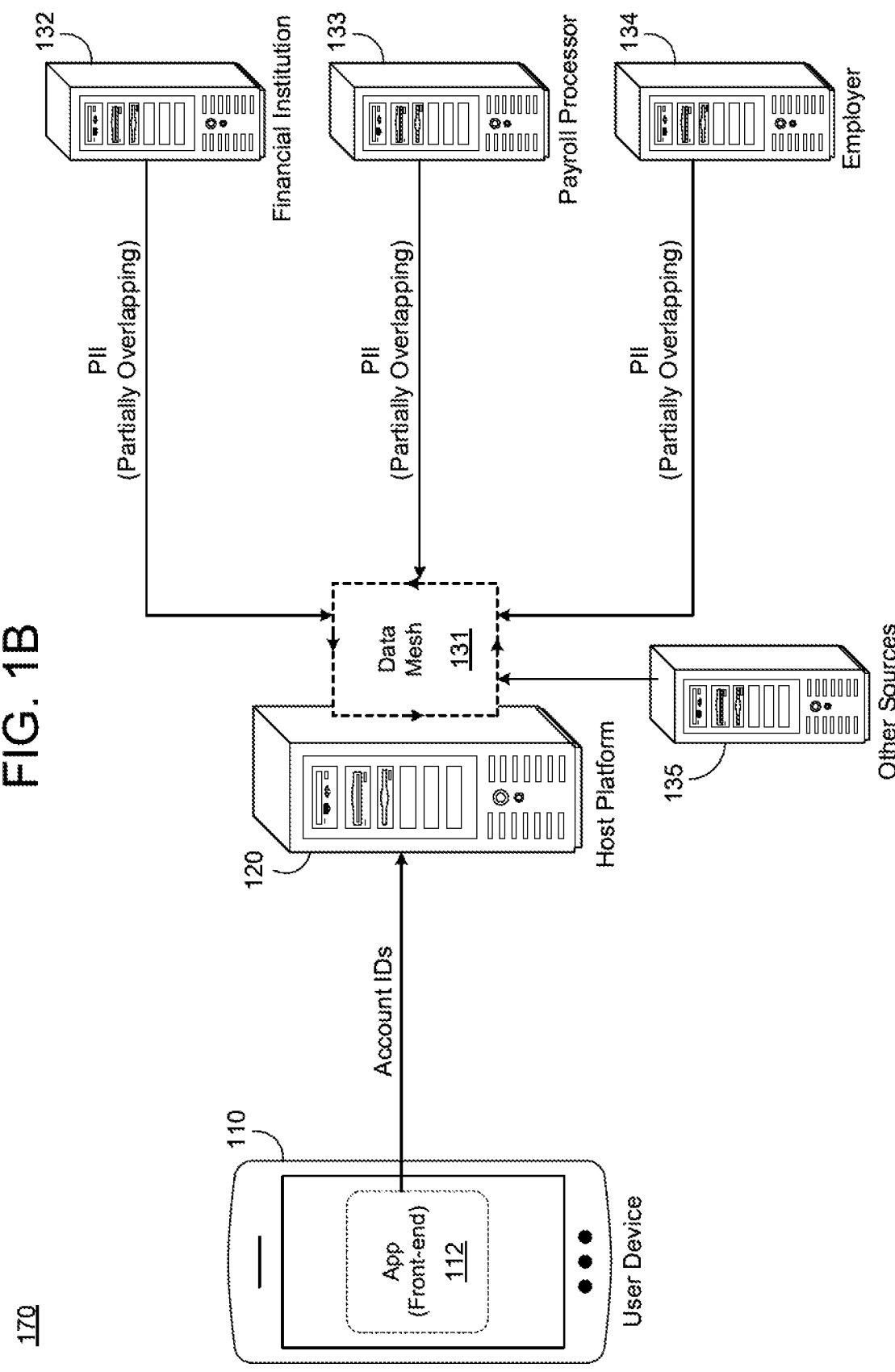

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, details are set forth to provide a reader with a thorough understanding of various example embodiments. It should be appreciated that modifications to the embodiments will be readily apparent to those skilled in the art, and generic principles defined herein may be applied to other embodiments and applications without departing from the spirit and scope of the disclosure. Moreover, in the following description, numerous details are set forth as an explanation. However, one of ordinary skill in the art should understand that embodiments may be practiced without the use of these specific details. In other instances, well-known structures and processes are not shown or described so as not to obscure the description with unnecessary detail. Thus, the present disclosure is not intended to be limited to the embodiments shown, but is to be accorded the widest scope consistent with the principles and features disclosed herein.

Financial transactions (i.e., transactions) are events that represent the movement of money from one party to another. A bank account may include a document, file, spreadsheet, printout, digital user interface, or the like, with the history of transactions over a period of time in the form of transaction records. Transaction records can include several pieces of data, for example, a date of the transaction, an amount of the transaction, whether it was a credit or debit, and the transaction string. As described herein, a transaction string is a collection of text that provides additional detail about the transaction and might include additional date information, location information, and ideally a description of the other entity (or "counterparty") involved in the transaction (aside from the owner of the financial account). Transaction strings are typically unique to a particular financial institution that creates the transaction string. Each financial institution may use different content, different ordering, different variability, and the like, within a transaction string.

Multiple credit transactions from the same counterparty to the same depository account may be considered a "deposit source" or "recurring deposit source". The text of transaction strings received from a single deposit source to a single bank account will still contain variability. Deposit sources may represent different financial agreements. For example, a common deposit source is termed or classified as "payroll", which occurs when an employer deposits a paycheck on a recurring basis into an employee's bank account. However, a given deposit source is not necessarily classified as payroll. Other examples of deposit sources include, but are not limited to, peer-to-peer, basic income, mortgage payments, grants, child care, alimony, and the like.

In the example embodiments, a machine learning system can identify a category such as a deposit source from a transaction string (e.g., whether the transaction can be classified as arising from payroll, peer-to-peer, basic income, mortgage payment, grant, child care, alimony, etc.). The machine learning system can label each transaction string with its identified category (e.g., deposit source, etc.), thereby increasing the amount of data available for further processing and interpretation of the transaction string. In particular, a deposit source classifier model (e.g., a machine learning classification model based on algorithms including, but not limited to, decision trees, boosting, bagging, discriminant analysis, Naïve Bayes, support vector machines, neural networks, etc.) may learn from a plurality of transaction strings to identify which deposit source category applies to the transaction strings. Additional machine learning algorithms and processing steps, including clustering (e.g. k-means), topic modeling (e.g. Latent Dirichlet Allocation (LDA)), dimensionality reduction (e.g. Principal Component Analysis (PCA), Singular Value Decomposition (SVD), Independent Component Analysis (ICA)), etc. can be performed on a plurality of the transactions to preprocess, pre-group, and/or filter transactions for processing in a system, pipeline, or ensemble of machine learning transactions, to further aid the deposit source classifier model in performing classifications of transaction strings. The machine learning system may then generate a classifier for classifying future or additional transaction strings based on the identified deposit sources. For example, this processing methodology can determine patterns of correlation with the derived category to all identified historical and future transactions from a given deposit source.

The classifier created by the machine learning system described herein may be used to classify transaction records. During this process, each transaction record may receive an addition label identifying its deposit source. Furthermore, additional machine learning can be used to process the "enhanced" transaction records to identify additional aspects of the transactions such as counterparties. Also, additional verifications such as income verification can be performed for a user based on such enhanced transaction strings. For example, a person may claim that they make a particular amount of income such as a person applying for a government benefit or the like. The machine learning system described herein can quickly identify sources of income for the user, and also the types of such income. Furthermore, the machine learning system can differentiate what might be termed "earned" income or payroll versus other classes of income, such as basic income, alimony, gambling winnings, income from other government benefit programs, grants, income related to employment, work-related income, and the like. This differentiation allows the host platform herein to determine and verify whether the user is eligible for such a benefit, depending on thresholds, earning requirements, and other program considerations.

In some embodiments, the machine learning system described herein may be hosted on a host platform which may include or otherwise be coupled to a blockchain network of distributed computing machines or virtual machines, however, embodiments are not limited thereto. In addition to the blockchain network or instead of the blockchain network, the host platform may include a cloud platform, a web server, a distributed network of servers, one or more databases for storing input and output data created by machine learning models, and the like.

FIGS. 1A-1B illustrate examples of a host platform 120 that is configured for eligibility verification and benefit administration in accordance with example embodiments. As an example, the host platform 120 may include one or more of an application server, a cloud platform, a blockchain network, and the like. In this example, the host platform 120 is a distributed system (e.g., blockchain network, distributed database, etc.) with a plurality of peers 121, 122, 123, 124, and 125, however, embodiments are not limited to a decentralized architecture, but may also include a centralized architecture. In this example, each of the peers 121-125 may include a software installed therein that establishes a shared ledger (e.g., blockchain ledger, etc.) and provides address information (e.g., URL's for accessing, etc.) for each of the peers 121-125. Also, the peers 121-125 may cooperate in the management of the shared ledger.

In the example embodiments, the host platform 120 may execute one or more verifications of a user, such as income verification, identity verification, benefit administration eli-gibility verification, and the like. In FIG. 1A, a peer 122 ingests data from multiple sources and builds a data mesh 130 as further described in the example of FIG. 1B. To perform this process, a user may upload account IDs via a mobile device 110. The account IDs may be received via an application programming interface (API) 126 of the host platform 120. In response, the host platform 120 may pull/retrieve data from financial accounts such as bank account statements, debit card statements, credit card statements, account summaries, and the like.

The ingested account data may include transaction records with information such as transaction strings, payment amounts, payment dates, geographic location data of the transaction, etc. The ingested data may be enhanced according to various embodiments prior to any verifications being performed in order to further improve the accuracy of the verifications. For example, the host platform may perform a deposit source classification process 140 on the transaction records using transaction strings within the transaction records. The deposit source classification process 140 may build a classifier with mappings between transaction strings and a plurality of predefined categories of transactions (e.g., a plurality of income source types, deposit source types, etc.) using machine learning. As a non-limiting example, the categories may include deposit source classifications that specify a type of credit associated with a payment/credit to the user's account. The categories of such deposit source may include, but are not limited to, payroll, peer-to-peer, alimony, child care, basic income, grants, miscellaneous, and the like.

Although not shown in FIG. 1A, the host platform may also use machine learning during this stage to identify a counterparty of each transaction. In this example, the transactions refer to credit transactions that deposit money into a user's account. The "counterparty" in this example refers to the other entity in the transaction (i.e., the payor) who pays the money to the user's account. Machine learning can be used to perform such processes. An example of counterparty identification using machine learning is described in U.S. patent application Ser. No. 17/342,622, filed on Jun. 9, 2021, in the United States Patent and Trademark Office, which is fully incorporated herein by reference for all purposes.

The host platform 120 may also perform a reconciliation and/or deduplication process 150 to further enhance the ingested transaction records. For example, reconciliation may identify whether two transaction records are from the same transaction (i.e., refer to the same payment, etc.). As another example, the reconciliation process may identify whether the two transaction records are from two different entities (i.e., a payee and a payor, etc.), such that the two transaction records are from the same transaction, but from different perspectives. In this case, the reconciliation process may modify one of the transaction records to include the date from the other transaction record to create a bigger transaction record. To identify whether two or more transactions are duplicates, a deduplication process can be performed to find and then remove duplicates before further processing is performed on the ingested transaction records. An example of reconciliation and deduplication is described in U.S. patent application Ser. No. 17/835,044, filed on Jun. 8, 2022, in the United States Patent and Trademark Office, which is fully incorporated herein by reference for all purposes.

The processed transaction records, including any deposit source identification, counterparty identification, and/or reconciliation and deduplication, may be further processed for purposes of verifying the user of the transaction records. For example, one or more verification processes 160 may be executed by the host platform 120 to verify aspects of the user such as income, identity, eligibility for benefits, and the like. Examples of the verification processes are described in U.S. patent application Ser. No. 17/580,721, filed on Jan. 21, 2022, which is fully incorporated herein by reference for all purposes.

FIG. 1B illustrates a process 170 for building a data mesh from ingested data in accordance with example embodiments. Before transaction records can be verified, the host platform 120 may build a data mesh 131 based on account data and other data of a user that is ingested from one or more sources. In this example, the ingested data is pulled from a financial institution server 132, a payroll processor server 133, and an employer server 134, via APIs, etc. Here, a front-end 112 of a software application hosted according to various embodiments may be downloaded from a marketplace, etc., and installed on the mobile device 110 such as a smart phone, a tablet, a laptop, a personal computer, etc. It should also be appreciated that the host platform 120 may host a web application, a website, an authentication portal, or the like, which involve verifying a user online.

In this example, a user may input account numbers/ routing numbers or login credentials of bank accounts, employer accounts (e.g., gig employers, etc.), payroll company accounts, credit accounts, etc., held by trusted sources of truth such as banks, credit agencies, payroll processors, employers/organizations, institutions, and the like, into one or more input fields displayed within a user interface of the front-end 112 of the application and submit them to the host platform 120 by clicking on a button within the user interface of the front-end 112. For example, the mobile device 110 and the host platform 120 may be connected via the Internet, and the front-end 112 may send the information via an HTTP message, an application programming interface (API) call, or the like. When the account identifiers are transmitted, a response containing relevant account information and the like may be received.

In response to receiving the account information, the host platform 120 may register/authenticate itself with various trusted sources of truth where the accounts/user accounts are held/issued. For example, the host platform may perform a remote authentication protocol/handshake with the financial institution server 132, the payroll processor server 133, and the employer server 134, another data source 135, and the like, based on user account information that includes an account issued by the bank, a source of funds from the payroll processor, and an employer that pays the user. These accounts provide the host platform with a unique mesh (data mesh 131) of partially-overlapping data sets that can be combined into one larger data set and analyzed. In the example embodiments, the combination of data from the different sources of truth (e.g., financial institution server 132, payroll processor server 133, employer server 134, and other sources 135) can be combined into the data mesh 131 by the host platform 120. It should also be appreciated that the user may manually upload data such as documents, bank statements, account credentials, and the like, in a format such as a .pdf, .docx, spreadsheet, XML file, JSON file, etc. Furthermore, optical character recognition (OCR) may be performed on any documents, files, bank statements, etc. obtained by the host platform 320 to extract attributes from such documents and files.

The authentication process may include one or more API calls being made to each of the different third-party services (bank, payroll, employer, etc.) via a back-end of the software application on the host platform 120 to establish a secure HTTP communication channel. For example, the back-end of the software application may be embedded or otherwise provisioned with access credentials of the user for accessing the different third-party services. The back-end may then use these embedded, provisioned, and/or otherwise securely stored credentials to establish or otherwise authenticate itself with the third-party services as an agent of the user. Each authenticated channel may be established though a sequence of HTTP communications between the host platform 120 and the various servers. The result is a plurality of web sessions between the host platform 120 and a plurality of servers, respectively. The host platform 120 can request information/retrieve information from any of the servers, for example, via HTTP requests, API calls, and the like. In response, the user data can be transmitted from the servers to the host platform 120 where it can be combined the data mesh 131 for further processing.

In some embodiments, the host platform 120 described herein may include or otherwise be coupled to a blockchain network which may be a public blockchain network or a permissioned/private blockchain network. Examples of the types of blockchain frameworks that can be used include Ethereum, Solana, EOS, Cardano, Hyperledger Fabric, and the like. As an example, an application server may host a mobile application or web application that provides the verification processes described herein. The application server may be coupled to a blockchain network and may transmit results of the verification processes and confirmations of the payments to a blockchain ledger of the blockchain network. The blockchain network may include a plurality of blockchain-enabled peers (e.g., distributed computing machines, virtual machines, etc.) that work together to write to and/or manage the blockchain ledger.

Each of the blockchain-enabled peers may be a member of the blockchain network and may include a local copy of the blockchain ledger. Depending on the choice of blockchain protocol employed for the particular application, the peers may execute consensus based protocols and network-wide communications including gossip to ensure that no single peer can update the blockchain ledger by themselves and also to ensure that a state of the content stored in the blockchain(s) on the local blockchain ledgers of all of the peers is the same/synchronized. Furthermore, to ensure that the blockchain ledger is "immutable" and cannot be changed, each new block added to the ledger may include a hash pointer to an immediately previous block on the blockchain ledger. For example, a committing peer may hash a value from the previous block (e.g., a block header, block data section, block metadata, or the like) and store the hash value in the new block (e.g., in a block header, etc.).

The blockchain-enabled peers may be trusting entities or untrusting entities with respect to each other. In some embodiments, the blockchain-enabled peers may work together to achieve a consensus (i.e., an agreement) on any data that is added to the blockchain ledger before it is committed. In some cases, peers may have different roles and peers may have multiple roles. As an example, a committing peer refers to a peer that stores a local copy of the blockchain ledger and commits blocks locally to its instance of the blockchain ledger. Most if not all peers in the blockchain network may be committing peers. Prior to the data being committed, peers execute a consensus process of some kind to ensure that the requirements for adding the data to the blockchain ledger (e.g., specified by policy of the blockchain, etc.) has been satisfied. Examples of consensus processes include proof of work, endorsement, proof of stake, proof of history, and the like.

An ordering service or ordering peer may receive transactions which are to be added to the blockchain and order the transactions based on priority (e.g., time of receipt, etc.) into a block. After the block is filled, the ordering service may generate a new block and distribute the block to the committing peers.

In some embodiments, blockchain transactions may require "endorsement" by at least a small subset of peers within the blockchain network before being added to a new block. In this example, an "endorsing" peer may receive a new blockchain transaction to be stored on the blockchain ledger, and perform an additional role of simulating content (e.g., within the blockchain transaction) based on existing content stored on the blockchain ledger to ensure that the blockchain transaction will not have issues or fail. The endorsement process may be performed prior to adding the blockchain transaction to the block by the ordering service. Thus, in that case, only "endorsed" transactions may be added to a new block to be committed to the blockchain ledger. In some embodiments, only a subset of peers (e.g., a small group of trusted systems out of a larger group of systems of the blockchain network, etc.)

Although the examples herein refer to a host platform that is integrated with a blockchain network/blockchain ledger for storage of data, the data may be stored on other storage types as well and not just a blockchain ledger. For example, any data store such as a database, relational database, topic-based server, cloud platform, distributed database, and the like, may be used.

Figure 2A:
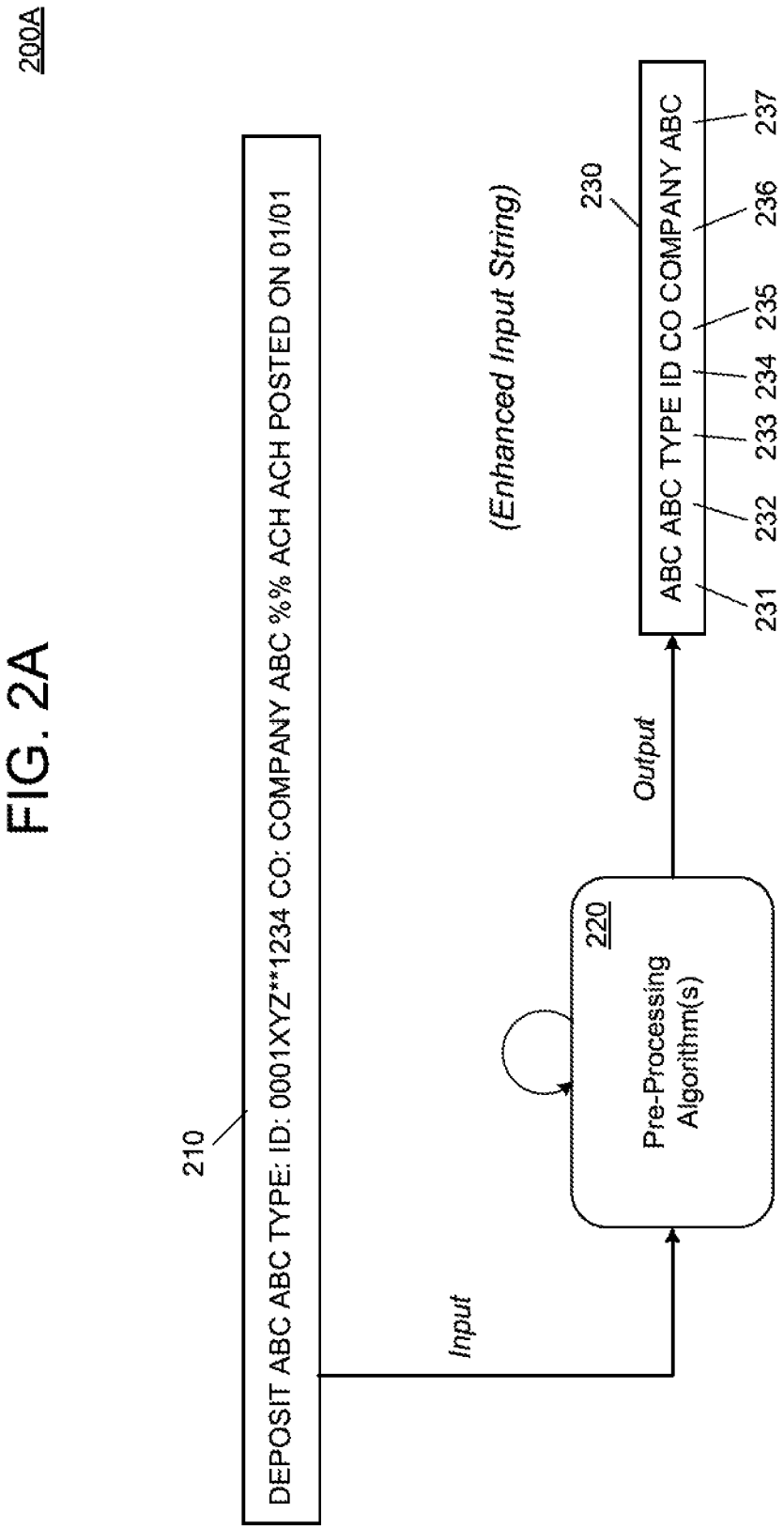
FIGS. 2A-2B are diagrams illustrating a process of cleaning transaction strings in accordance with example embodiments.
Figure 2B:
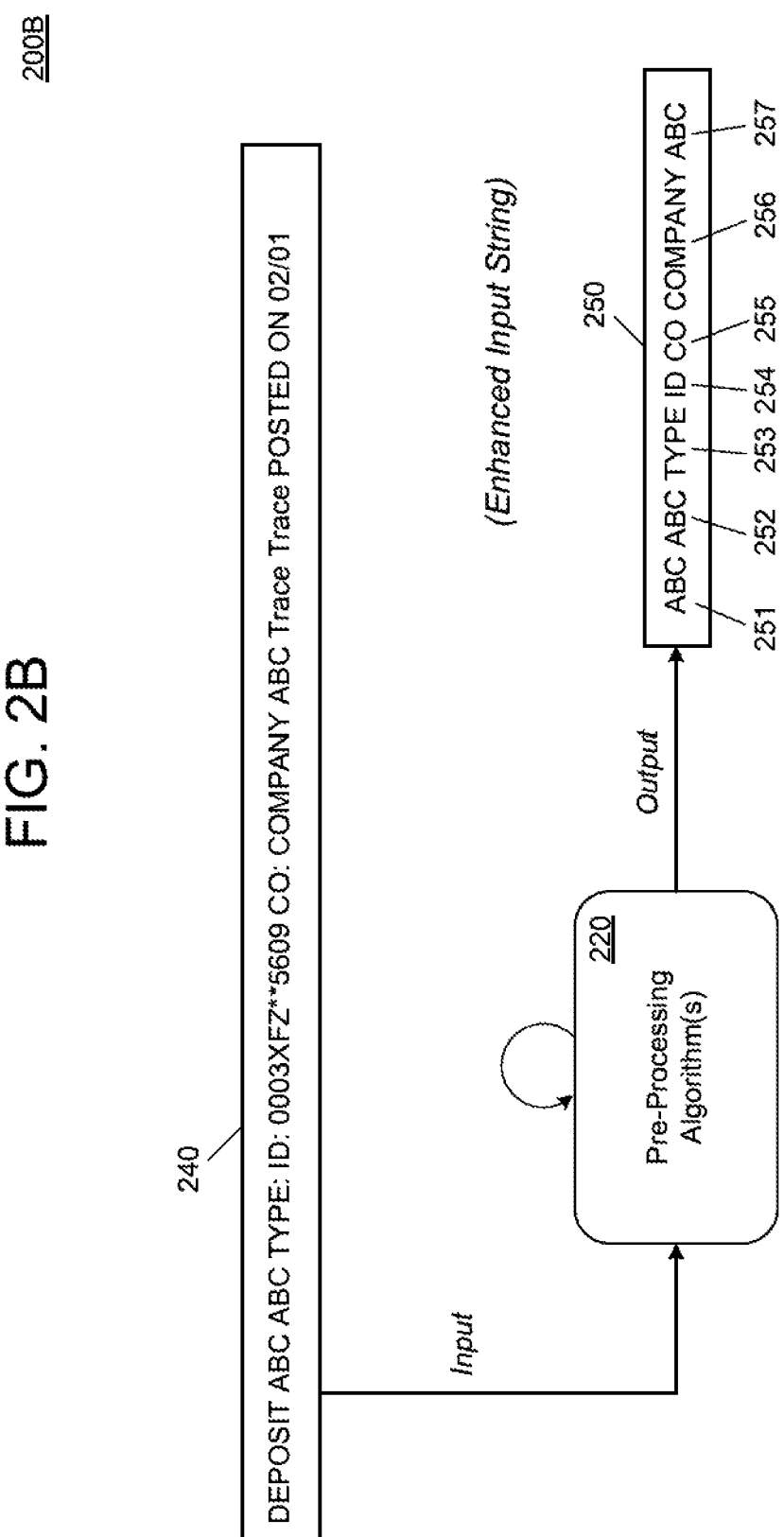

FIGS. 2A-2B illustrate a process for cleaning transaction strings in accordance with example embodiments. Referring to FIG. 2A, a process 200A of enhancing a transaction string 210 is shown. To prepare transaction records for further processing, a transaction string may be pulled from the transaction record and "enhanced" by reducing or removing variability, such as common keywords and identifiers, reference numbers, and the like, from the string. Variability in the transaction string can cause incorrect mappings and the like. By cleaning the string before further processing, the variability can be reduced or removed, making the strings easier to compare and match together. Here, one or more pre-processing algorithms 220 may be executed on an input transaction string 210 to create an enhanced transaction string 230.

The pre-processing algorithms 220 may include, but are not limited to, string parsing operations such as removal of common keywords, removal of variable dates, removal of variable reference numbers, removal of non-word characters, removal of whitespace, standardization, and the like. The result is a smaller-sized (less data, less words, less string size, etc.) transaction string 230 with a pattern of words or tokens 231, 232, 233, 234, 235, 236, and 237, which represent the non-variable aspects of the transaction string. The pattern may require both the tokens and the sequence order shown (i.e., 231 followed by 232, followed by 233, etc.). These aspects should be the same or similar for similar transactions. The purpose of applying these algorithms is to isolate the transaction string variability and make it possible to group transactions together based on the similarity between transaction strings after variability has been removed. This variability reduction or removal allows the host platform to compute features on the deposit source transaction groups such as pay frequency, when combined with additional data automatically extracted from the transaction strings and/or corresponding transaction records for deposit source classification.

FIG. 2B illustrates another example of a process 200B of enhancing a transaction string 240, which is similar to the process 200A shown in FIG. 2A. Here, an input transaction string 240 includes different string content than the input transaction string 210 shown in FIG. 2A. However, after the host platform applies the pre-processing algorithms 220, a resulting enhanced transaction string 250 is generated which is the same as the enhanced transaction string 230 shown in FIG. 2A. In particular, enhanced transaction string 250 includes tokens 251, 252, 253, 254, 255, 256, and 257 that match the tokens 231, 232, 233, 234, 235, 236, and 237 of the enhanced transaction string 230, and are in the same sequence order. In other words, once the variability is removed from the transaction string 210 and the transaction string 240, the output enhanced transaction strings 230 and 250 are the same.

According to various aspects, a machine learning model may be used to process the enhanced transaction strings output by the pre-processing algorithms 220 to assign categories to the transaction strings that are meaningful for future models which generate additional financial insights from these transaction strings. The machine learning algorithm(s) may include, but is not limited to, tree-based classifications (e.g., decision trees, boosted trees, bagged trees, etc.), discriminant analysis, Naïve Bayes, support vector machines, neural networks, etc. As another example, a deep-learning neural network may be used or the like. Additional machine learning algorithms and processing steps, including clustering (e.g. k-means), topic modeling (e.g. Latent Dirichlet Allocation (LDA)), dimensionality reduction (e.g. Principal Component Analysis (PCA), Singular Value Decomposition (SVD), Independent Component Analysis (ICA)), etc. can be performed to preprocess, pre-group, and/or filter transactions for processing in a system, pipeline, or ensemble of machine learning transactions, to further aid the deposit source classifier model in performing classifications of transaction strings.

As an example of classification, the categories may correspond to different types of income sources (also referred to herein as deposit sources). A deposit source is a source that deposits funds into a user's account. In today's work environment, many people obtain income from multiple sources including a primary source of income and a secondary source of income. People may also have income from government assistance, grants, peers (other people), tenants (rent payments, etc.), and the like. The categories, in this example, may include different types of income such as payroll, peer-to-peer, basic income, child care, rental income, grants, and the like. The output of the deposit source classification process is a classifier that knows the decision boundary between transaction categories and can be used to process additional transaction such as historical transactions or new and future transactions from that deposit source.

In particular, the category of a transaction is generally not evident when it is ingested in its raw format. One common solution is to identify keywords that could definitely indicate the transaction's category. Unfortunately, such keywords rarely exist in a given transaction string. The examples further described herein are directed to a machine learning model that may be used to classify a transaction string to a deposit source (or other category). The machine learning model may classify transactions where transaction category indicative keywords do not necessarily exist in the transaction string. The methods included in this system enables these transaction classifications to be enhanced by including additional information. For example, additional features such as the frequency that the deposit source deposits transactions, the variability in the deposit source's transaction amounts, etc. can inform and improve these classifications.

Figure 3A:
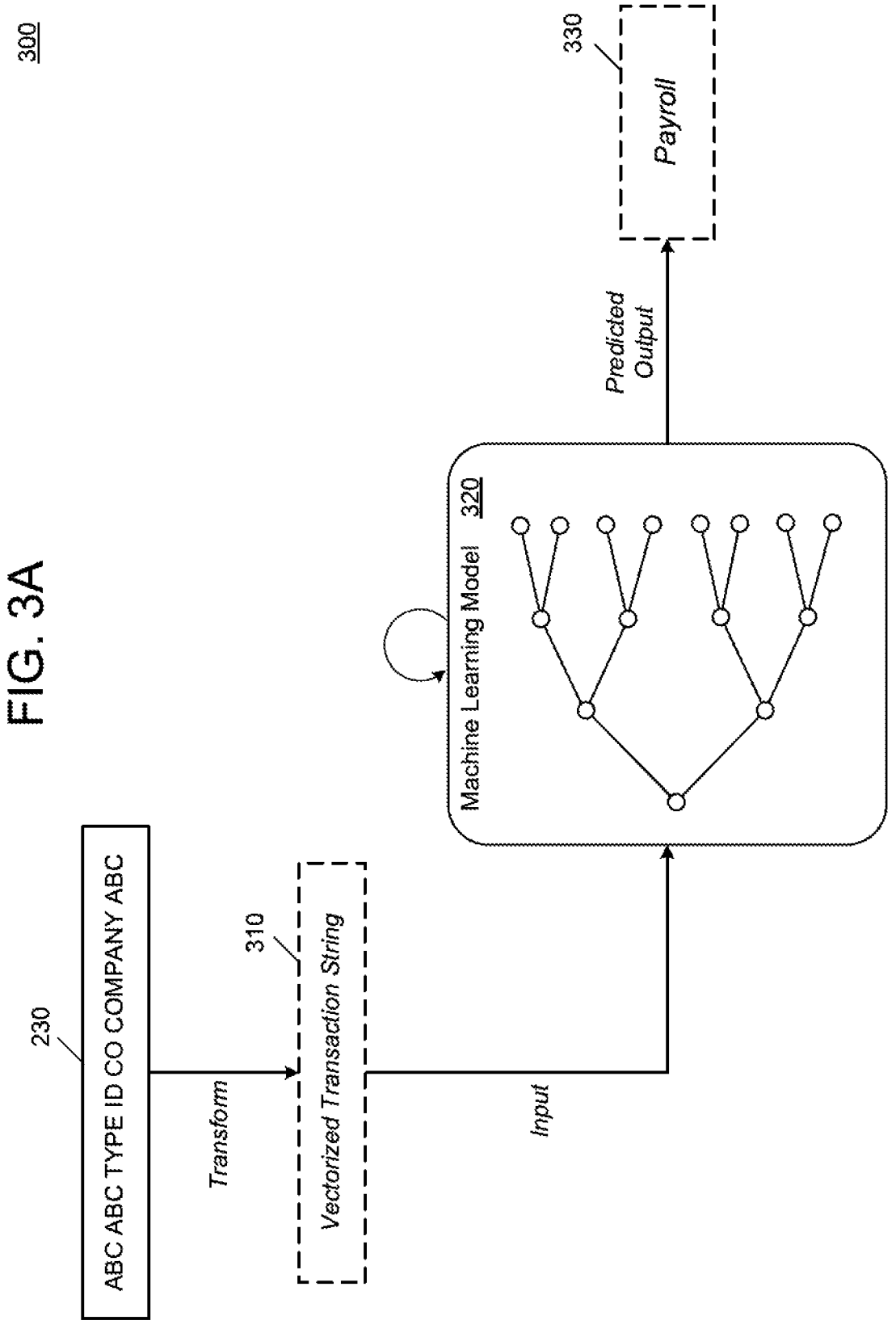

FIG. 3A illustrates an example of a machine learning model 320 determining a category 330 of a transaction string 230 according to example embodiments. In this example, the transaction string 230 corresponds to the enhanced transaction string generated by the pre-processing algorithms 220 shown in FIGS. 2A-2B. The transaction string 230 may include text content which may be processed by the machine learning model 320. As another example, the machine learning model 320 may require numerical values for processing by a digital computer. In this example, the input transaction string 230 may be transformed into a vector 310 using a vectorization process, encoding process, etc.

The machine learning model 320 may be trained to identify a deposit source classification for the transaction string 230. For example, the machine learning model 320 may determine whether the transaction string 230 corresponds to a payroll transaction, a peer-to-peer transaction, alimony, child care, basic income, a grant, 1099 income, or any other type of income source. The resulting predicted output is the category 330 which in this example is "payroll".

The process of classifying transactions strings may be an iterative process that is performed on hundreds, thousands, or more transaction records. FIG. 3B illustrates an example of a processing performed by a host platform for multiple transaction records. As an example, the host platform may control the predictive process as a batch processing process, for example, synchronous batch processing (real-time), asynchronous batch processing (subsequent), by processing each of the individual transactions comprising a batch in real-time streaming systems (e.g., using an Apache Kafka-based streaming system, etc.), by processing mini-batches of transactions, or the like.

Referring to FIG. 3B, a process 340 of processing multiple transaction records in a batch is shown. Here, a host platform 342 may provide location data to the machine learning model 320 (e.g., provide data to a web service or the like which hosts the machine learning model 320, etc.). The location data may include an address or other location of the input data (e.g. feature data) stored within a source database 350. The feature data may include enhanced transaction string records, etc. The location data may also include a storage location for the outputs of the machine learning model 320 (i.e., the predicted classifications of the deposit source, etc.).

The machine learning model 320 may request the input data from the source database 350, for example, via an API call or the like. In response, the source database 350 may return the input data, transaction strings, transaction records, and the like. The machine learning model 320 may process the transaction strings to create predicted classifications for each of the transaction strings. These predicted classifications can be stored in the target database 360 based on the location data from the host platform 340. In addition to the predicted outputs, the target database may store a more complete record such as a mapping between the category (i.e., deposit source classification value) and the transaction record which may include the original transaction string, the enhanced transaction string, additional transaction record content (e.g., payment date, amount, geographical location, time, counterparty, etc.), the full transaction record, and/or the like.

Figure 3C:
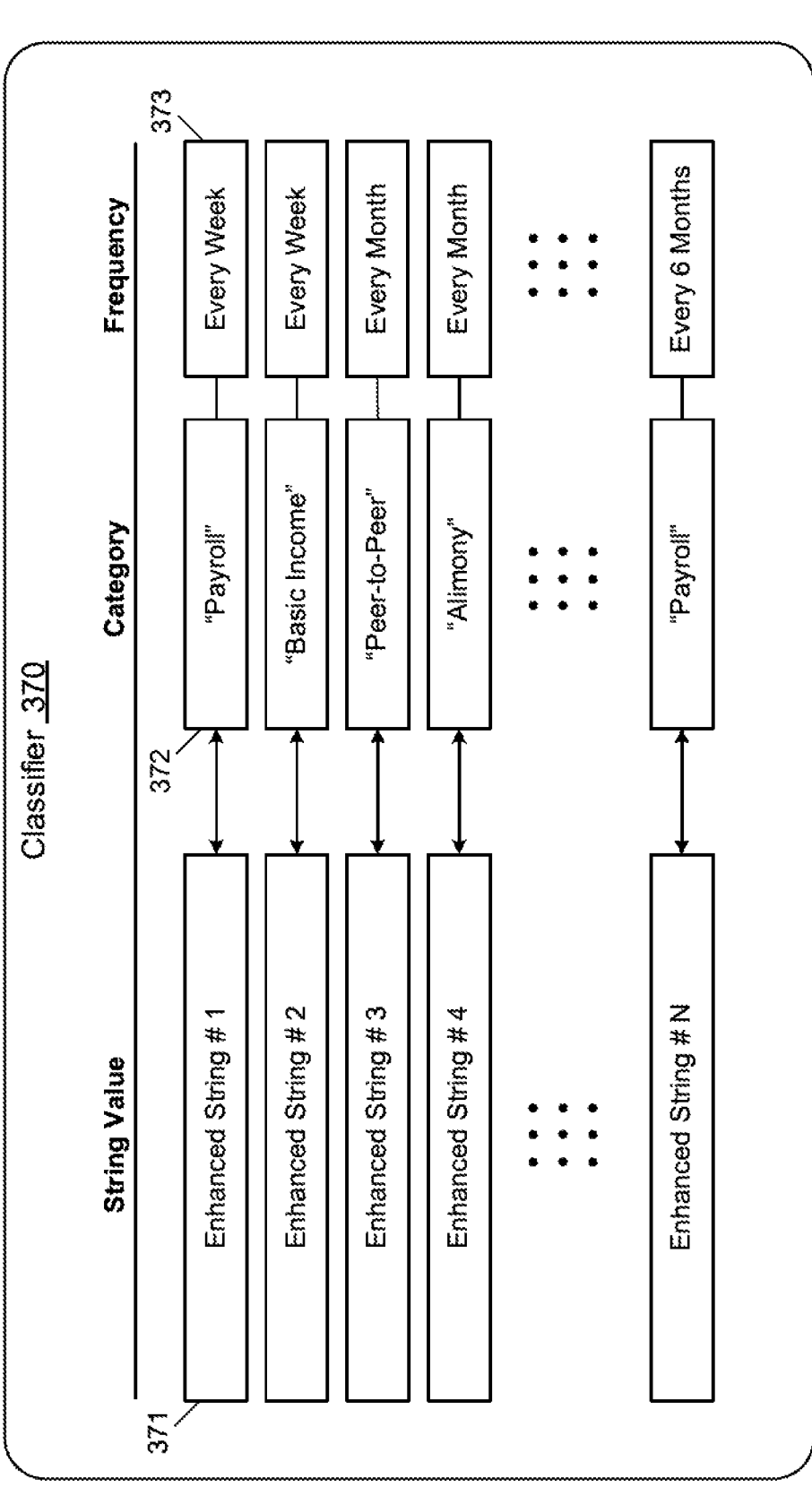

FIG. 3C illustrates an example of building a classifier 370 from the outputs of the machine learning model 320 in FIG.

3B. For example, the classifier 370 may be built using mappings output by the machine learning model 320 and stored in the target database 350. In a simple example, the classifier 370 may include each of the mappings created by the machine learning model 320. As another example, a service can analyze the mappings created by the machine learning model 320 to identify keys within the mappings which are more relevant for mapping transactions. Each mapping in this example may include a string identifier 371 (e.g., the enhanced transaction string), a category 372 (e.g., the deposit source classification mapped to the string identifier), and a frequency 373 representing the frequency of a payment/deposit from the deposit source. The classifier 370 may be used for further processing of transactions from the user's account(s). For example, the classifier 370 may be applied to historical transaction records of the user and/or to future transaction records of the user.

In some embodiments, the classifier 370 may be generated using only a subset of transaction records from a user's bank account, credit card account, payroll account, employer account, etc. Accordingly, the classifier 370 may be used to classify the remaining transaction records within the user's bank account or accounts. Also, the classifier may be used to classify future transaction records of the user that are received over time.

Figure 4:
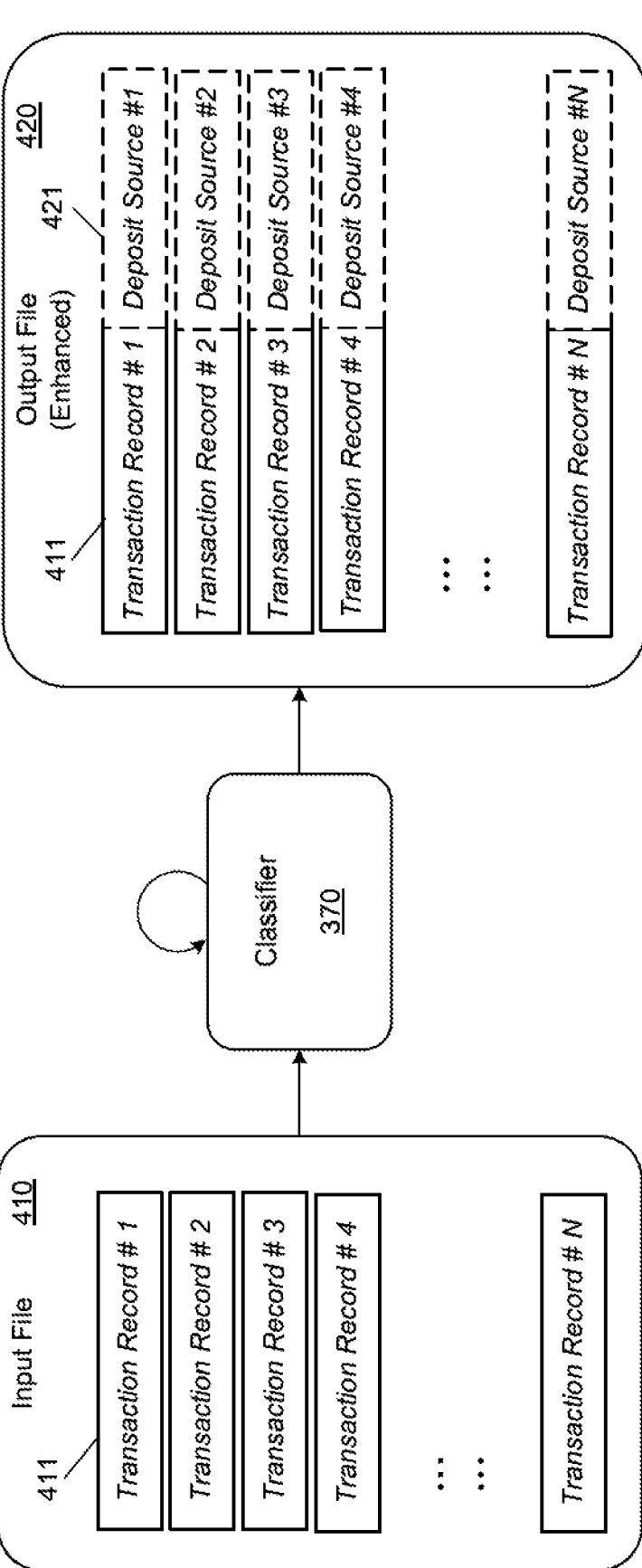
FIG. 4 is diagram illustrating batch processing of transaction records using the classifier in accordance with example embodiments.

FIG. 4 illustrates batch processing of transaction records using the classifier 370 of FIG. 3C, in accordance with example embodiments. As previously noted with respect to FIGS. 3A-3C, a batch processing may be performed on multiple transaction records in one or more accounts of the user. The batch processing may be performed in a synchronous manner (e.g., in real-time upon request) or asynchronously (e.g., a periodic task every week, month, etc.). Referring to FIG. 4, the classifier 370 may be executed on a plurality of transaction records 411 stored within an input file 410.

Each transaction record may include a transaction string which has been enhanced using the pre-processing described in FIGS. 2A-2B. The classifier 370 may identify a category (e.g., a deposit source classification) for each transaction record and add a label of the identified category to the transaction record in an output file 420. In FIG. 4, each transaction record 411 is paired with a label 421, which identifies the category of the transaction identified by the classifier 370. The classifier 370 may iteratively perform this process in jobs until all of the transaction records in the input file 410 are processed and stored in the output file 420 along with the label 421.

The labeled transaction records created by the classifier 370 described according to various embodiments may be used for further processing of the transaction records. As an example, the classification process described herein may be a precursor (pre-processing step) for an income verification process such as described in U.S. patent application Ser. No. 17/580,721, filed on Jan. 21, 2022, which is already incorporated herein by reference for all purposes. For example, the classifier 370 may identify which transaction records are income, and which are not. Thus, only the transaction records labeled as income, may be input to the analytical models used for income verification therein. As another example, only certain types of income (e.g., payroll, etc.) may be input to the analytical models, while the other types of income are not considered or input, thereby reducing the amount of data considered by the income verification process.

As another example, the labeled transaction records created by the classifier 370 may be a precursor (pre-processing step) for a reconciliation and deduplication process such as described in Ser. No. 17/835,044, filed on Jun. 8, 2022, in the United States Patent and Trademark Office, which is already fully incorporated herein by reference for all purposes. For example, the classifier 370 may label the transaction records with particular types of deposit source classifications which can be used as an additional data point for matching transaction records together (or identifying transaction records that don't match). The label output by the classifier 370 may be given a different weight (e.g., a greater weight, etc.) than the other aspects of the transaction records being compared such as the date value, the amount value, the string value, etc. Accordingly, the classifier 370 may help improve the accuracy of the reconciliation and deduplication process.

As another example, the labeled transaction records created by the classifier 370 may be a precursor (pre-processing step) for a benefit administration process such as described in patent application entitle Benefit Administration Platform, filed on Jul. 14, 2022, in the United States Patent and Trademark Office, which is fully incorporated herein by reference for all purposes. For example, the classifier 370 may label the transaction records with particular types of deposit source classifications which can be used as an additional data point for matching transaction records together (or identifying transaction records that don't match) to verify that the person requesting the benefit has the correct income level.

Figure 5:
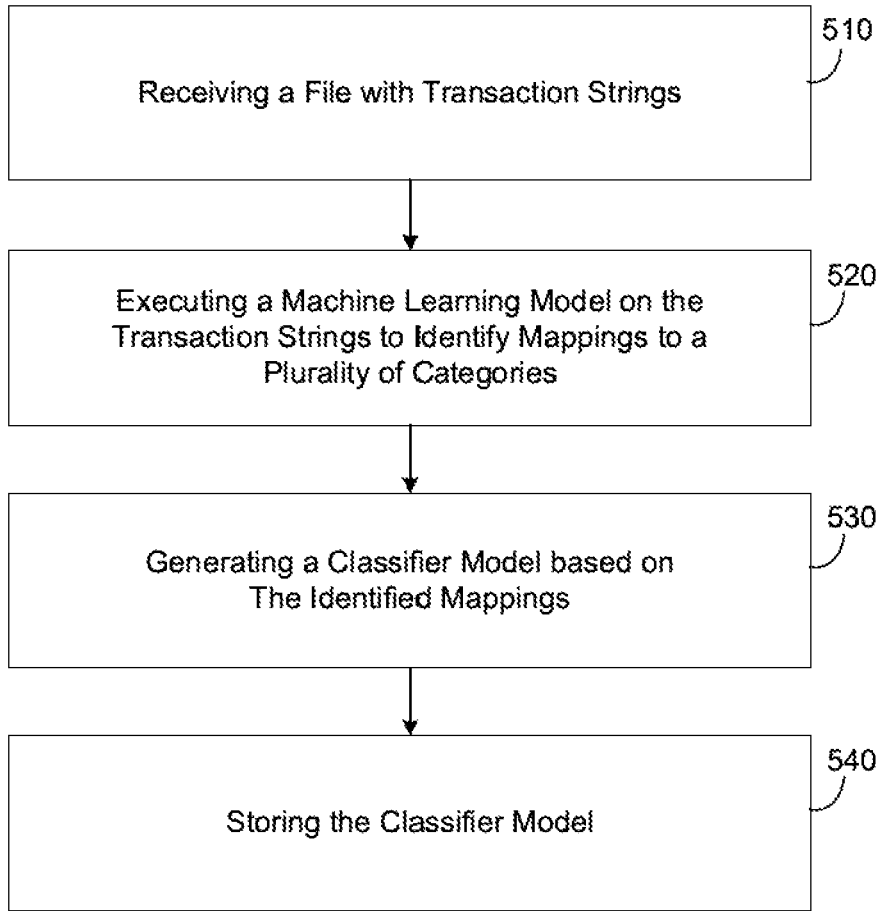
FIG. 5 is a diagram illustrating a method for generating a classifier for classifying transaction strings into categories in accordance with an example embodiment.

FIG. 5 illustrates a method 500 for generating a classifier for classifying transaction strings into categories in accordance with an example embodiment. For example, the method 500 may be performed by a host platform as described herein. Referring to FIG. 5, in 510, the method may include receiving a file comprising transaction strings corresponding to a plurality of transaction records. As an example, the file may include a file from a data mesh with partially overlapping transaction data sets. As another example, the file may include a bank account statement, credit card statement, account summary, or the like, with transaction records/strings stored therein such as in a line-item basis.

In 520, the method may include executing a machine learning model on the transaction strings to identify a mapping between the transaction strings and a plurality of categories. In 530, the method may include generating a classifier model that comprises respective patterns of keywords from the transaction strings mapped to the plurality of categories, respectively, based on the identified mappings. In 540, the method may include storing the classifier model in a data store.

In some embodiments, the method may further include parsing the plurality of transaction strings and removing variable features from the parsed transaction strings prior to executing the machine learning model on the transaction strings. In some embodiments, the removing may include deleting one or more of date values, non-word characters, and whitespaces, from the transaction strings, to create cleaned transaction strings. In some embodiments, the plurality of categories may include a plurality of deposit sources, and the executing comprises executing a tree-based classification model, another machine learning classification algorithm, or the like, on the transaction strings to identify which deposit source from among the plurality of deposit sources is mapped to each transaction string, respectively.

In some embodiments, the method may further include executing the classifier model on a plurality of additional transaction strings to identify and label each transaction string from among the plurality of additional transaction strings with a category from among the plurality of categories. In some embodiments, the method may further include executing a second machine learning model on the plurality of labeled additional transaction strings to identify counterparties of the additional transaction strings. In some embodiments, the method may further include executing a third machine learning model on the plurality of labeled additional transaction strings and the identified counterparties of the additional transaction strings to verify an income of a user associated with the plurality of additional transaction strings.

The above embodiments may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 6:
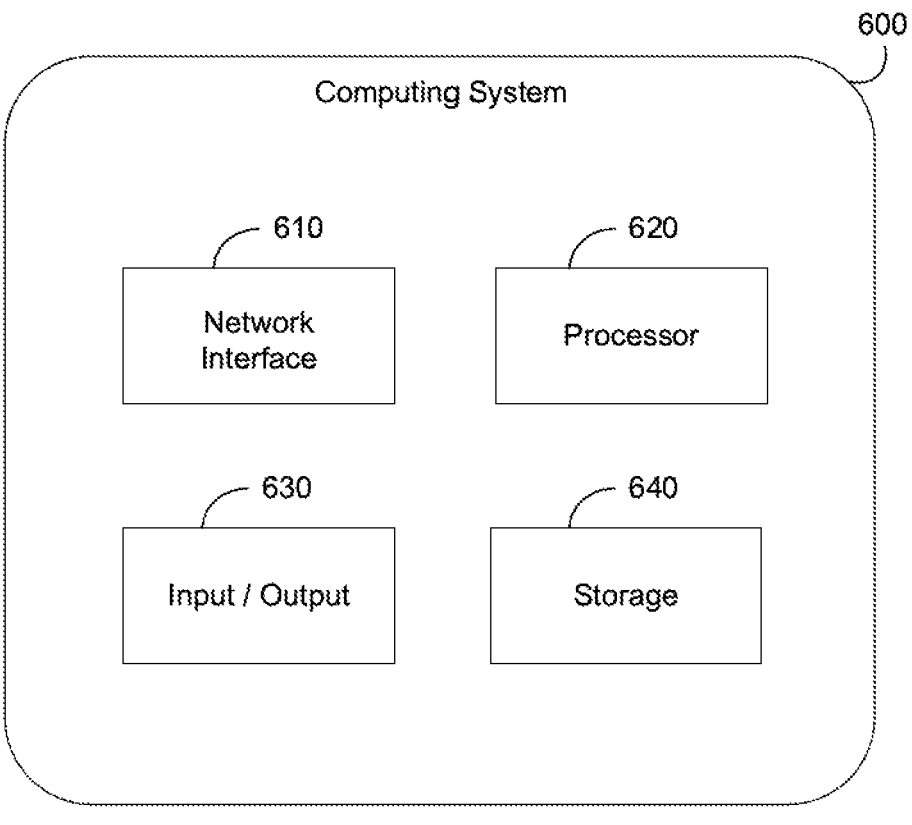
FIG. 6 is a diagram illustrating an example of a computing system for use in any of the examples described herein.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative configuration, the processor and the storage medium may reside as discrete components. For example, FIG. 6 illustrates an example computing system 600 which may process or be integrated in any of the above-described examples, etc. FIG. 6 is not intended to suggest any limitation as to the scope of use or functionality of embodiments described herein. The computing system 600 is capable of being implemented and/or performing any of the functionality set forth hereinabove.

The computing system 600 may include a computer system/server, which is operational with numerous other general purpose or special purpose computing system environments or configurations. Examples of well-known computing systems, environments, and/or configurations that may be suitable for use as computing system 400 include, but are not limited to, personal computer systems, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, databases, and the like, which may include any of the above systems or devices, and the like. According to various embodiments described herein, the computing system 600 may be, contain, or include a tokenization platform, server, CPU, or the like.

The computing system 600 may be described in the general context of computer system-executable instructions, such as program modules, being executed by a computer system. Generally, program modules may include routines, programs, objects, components, logic, data structures, and so on that perform particular tasks or implement particular abstract data types. The computing system 600 may be practiced in distributed cloud computing environments where tasks are performed by remote processing devices that are linked through a communications network. In a distributed cloud computing environment, program modules may be located in both local and remote computer system storage media including memory storage devices.

Referring to FIG. 6, the computing system 600 is shown in the form of a general-purpose computing device. The components of computing system 600 may include, but are not limited to, a network interface 610, a processor 620 (or multiple processors/cores), an input/output 630, which may include a port, an interface, etc., or other hardware, for outputting a data signal to another device such as a display, a printer, etc., and a storage device 640, which may include a system memory, or the like. Although not shown, the computing system 600 may also include a system bus that couples various system components, including system memory to the processor 620.

The storage 640 may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random-access memory (RAM) and/or cache memory. As another example, storage device 640 can read and write to a non-removable, non-volatile magnetic media (not shown and typically called a "hard drive") and/or a solid state drive (SSD). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media, and/or a flash drive, such as USB drive or an SD card reader for reading flash-based media, can be provided. In such instances, each can be connected to the bus by one or more data media interfaces. As will be further depicted and described below, storage device 640 may include at least one program product having a set (e.g., at least one) of program modules that are configured to carry out the functions of various embodiments of the application.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system 600 may also communicate with one or more external devices such as a keyboard, a pointing device, a display, etc.; one or more devices that enable a user to interact with computer system/server; and/or any devices (e.g., network card, modem, etc.) that enable computing system 600 to communicate with one or more other computing devices. Such communication can occur via I/O interfaces. Still yet, computing system 600 can communicate with one or more networks such as a local area network (LAN), a general wide area network (WAN), and/or a public network (e.g., the Internet) via network interface 610. As depicted, network interface 610 may also include a network adapter that communicates with the other components of computing system 600 via a bus. Although not shown, other hardware and/or software components could be used in conjunction with the computing system 600. Examples include, but are not limited to: microcode, device drivers, redundant processing units, external disk drive arrays, RAID systems, tape drives, and data archival storage systems, etc.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described regarding specific examples, it should be understood that various changes, substitutions, and alterations apparent to those skilled in the art can be made to the disclosed embodiments without departing from the spirit and scope of the disclosure as set forth in the appended claims.

The invention claimed is:

1. A computing system comprising:
   a data store configured to store a machine learning model; and
   a processor configured to:
      receive, via an application programming interface (API) call, a file comprising transaction strings corresponding to a plurality of transaction records;
      execute a machine learning model on the transaction strings to identify mappings between the transaction strings and a plurality of deposit source categories;

assign a label, by the machine learning model, to each of the transaction strings corresponding to its associated deposit source category as indicated in the identified mappings;

generate, by the machine learning model, a classifier model that comprises respective patterns of keywords from the transaction strings mapped to the plurality of deposit source categories, respectively, based on the identified mappings;

store the classifier model in the data store;

receive, via a second API call, a file including a plurality of additional transaction records, the plurality of additional transaction records corresponding to additional plurality of transaction strings;

execute the classifier model on the plurality of additional transaction strings to identify one of the deposit source categories to assign to each of the additional transaction records and to generate an output file including each of the additional transaction records further labeled with the deposit source category identified by the classifier model; and execute a second machine learning model on the output file including the plurality of labeled additional transaction strings to identify a counterparty of each additional transaction strings.

2. The computing system of claim 1, wherein the processor is further configured to parse the plurality of transaction strings and remove variable features from the parsed transaction strings prior to executing the machine learning model on the transaction strings.

3. The computing system of claim 2, wherein the processor is configured to remove one or more of date values, non-word characters, and whitespaces, from the transaction strings to create cleaned transaction strings.

4. The computing system of claim 1, wherein the plurality of categories comprises a plurality of deposit sources, and the processor is configured to execute a machine learning classification model on the transaction strings to identify which deposit source from among the plurality of deposit sources is mapped to each transaction string, respectively.

5. The computing system of claim 1, wherein the processor is further configured to execute a third machine learning model on the plurality of labeled additional transaction strings to verify an income of a user associated with the plurality of additional transaction strings.

6. A method comprising:

receiving, via an application programming interface (API) call, a file comprising transaction strings corresponding to a plurality of transaction records;

executing a machine learning model on the transaction strings to identify mappings between the transaction strings and a plurality of categories;

assigning a label, by the machine learning model, to each of the transaction strings corresponding to its associated deposit source category as indicated in the identified mappings;

generating, by the machine learning model, a classifier model that comprises respective patterns of keywords from the transaction strings mapped to the plurality of categories, respectively, based on the identified mappings;

storing the classifier model in a data store;

receiving, via a second API call, a file including a plurality of additional transaction records, the plurality of additional transaction records corresponding to additional plurality of transaction strings;

executing the classifier model on the plurality of additional transaction strings to identify one of the deposit source categories to assign to each of the additional transaction records and to generate an output file including each of the additional transaction records further labeled with the deposit source category identified by the classifier model; and executing a second machine learning model on the output file including the plurality of labeled additional transaction strings to identify a counterparty of each additional transaction strings.

7. The method of claim 6, wherein the method further comprises parsing the plurality of transaction strings and removing variable features from the parsed transactions strings prior to executing the machine learning model on the transaction strings.

8. The method of claim 7, wherein the removing comprises deleting one or more of date values, non-word characters, and whitespaces, from the transaction strings, to create cleaned transaction strings.

9. The method of claim 6, wherein the plurality of categories comprises a plurality of deposit sources, and the executing comprises executing the classifier model on the transaction strings to identify which deposit source from among the plurality of deposit sources is mapped to each transaction string, respectively.

10. The method of claim 6, wherein the method further comprises executing a third machine learning model on the plurality of labeled additional transaction strings and the identified counterparties of the additional transaction strings to verify an income of a user associated with the plurality of additional transaction strings.

11. A non-transitory computer-readable medium comprising instructions which when executed by a computer cause a processor to perform a method comprising:

receiving, via an application programming interface (API) call, a file comprising transaction strings corresponding to a plurality of transaction records;

executing a machine learning model on the transaction strings to identify mappings between the transaction strings and a plurality of categories;

assigning a label, by the machine learning model, to each of the transaction strings corresponding to its associated deposit source category as indicated in the identified mappings;

generating, by the machine learning model, a classifier model that comprises respective patterns of keywords from the transaction strings mapped to the plurality of categories, respectively, based on the identified mappings;

storing the classifier model in a data store;

receiving, via a second API call, a file including a plurality of additional transaction records, the plurality of additional transaction records corresponding to additional plurality of transaction strings;

executing the classifier model on the plurality of additional transaction strings to identify one of the deposit source categories to assign to each of the additional transaction records and to generate an output file including each of the additional transaction records further labeled with the deposit source category identified by the classifier model; and executing a second machine learning model on the output file including the plurality of labeled additional transaction strings to identify a counterparty of each additional transaction strings.

12. The non-transitory computer-readable medium of claim 11, wherein the method further comprises parsing the plurality of transaction strings and removing variable features from the parsed transactions strings prior to executing the machine learning model on the transaction strings. 5

13. The non-transitory computer-readable medium of claim 12, wherein the removing comprises deleting one or more of date values, non-word characters, and whitespaces, from the transaction strings, to create cleaned transaction strings. 10

14. The non-transitory computer-readable medium of claim 11, wherein the plurality of categories comprises a plurality of deposit sources, and the executing comprises executing a machine learning classification model on the transaction strings to identify which deposit source from 15 among the plurality of deposit sources is mapped to each transaction string, respectively.

\* \* \* \* \*